United States Patent
Lu et al.

(10) Patent No.: US 12,238,632 B2
(45) Date of Patent: Feb. 25, 2025

(54) SERVICE CONFIGURATION METHOD, COMMUNICATION APPARATUS, AND COMMUNICATION SYSTEM

(71) Applicant: Huawei Technologies Co., Ltd., Shenzhen (CN)

(72) Inventors: Changqi Lu, Shanghai (CN); Hui Ding, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 448 days.

(21) Appl. No.: 17/656,489

(22) Filed: Mar. 25, 2022

(65) Prior Publication Data

US 2022/0217611 A1 Jul. 7, 2022

Related U.S. Application Data

(63) Continuation of application No. PCT/CN2020/117149, filed on Sep. 23, 2020.

(30) Foreign Application Priority Data

Sep. 26, 2019 (CN) .......................... 201910918864.4

(51) Int. Cl.
*H04W 40/20* (2009.01)
(52) U.S. Cl.
CPC .................................. *H04W 40/20* (2013.01)
(58) Field of Classification Search
CPC ............................... H04W 40/20; H04W 48/04
See application file for complete search history.

(56) References Cited

U.S. PATENT DOCUMENTS

| | | | |
|---|---|---|---|
| 11,930,397 B2* | 3/2024 | Park | H04W 76/15 |
| 2019/0116520 A1 | 4/2019 | Chaponniere et al. | |
| 2019/0268835 A1 | 8/2019 | Shan et al. | |
| 2019/0335392 A1* | 10/2019 | Qiao | H04W 48/16 |
| 2020/0092423 A1* | 3/2020 | Qiao | H04W 80/10 |
| 2022/0330085 A1* | 10/2022 | Li | H04L 67/565 |
| 2023/0354447 A1* | 11/2023 | Talebi Fard | H04W 40/246 |
| 2024/0214109 A1* | 6/2024 | Zhang | H04L 1/0016 |

FOREIGN PATENT DOCUMENTS

| | | |
|---|---|---|
| CN | 102638886 A | 8/2012 |
| CN | 109155909 A | 1/2019 |
| CN | 109286567 A | 1/2019 |
| CN | 109315004 A | 2/2019 |

(Continued)

OTHER PUBLICATIONS

ETSI, 5G; Policy and charging control framework for the 5G System (5GS); Stage 2, 3GPP TS 23.503 V 15.5.0 Release 15 (Apr. 2019), 83 Pages.

(Continued)

*Primary Examiner* — Brian D Nguyen
(74) *Attorney, Agent, or Firm* — Slater Matsil, LLP

(57) ABSTRACT

This application provides a service configuration method, a communication apparatus, and a communication system. An AF configures a service request to an AMF by using an NEF, so that the AMF may request URSP configuration from a PCF when target UE is located in a target area. In this way, the PCF can effectively configure a URSP in a scenario in which an application service is dynamically deployed.

20 Claims, 8 Drawing Sheets

(56) References Cited

FOREIGN PATENT DOCUMENTS

| CN | 109862581 A | 6/2019 |
|---|---|---|
| CN | 110049533 A | 7/2019 |
| CN | 110149675 A | 8/2019 |
| CN | 110247849 A | 9/2019 |
| EP | 3700252 A1 | 8/2020 |
| EP | 3713306 A1 | 9/2020 |
| KR | 20180021636 A | 3/2018 |
| WO | 2016005005 A1 | 1/2016 |
| WO | 2019035614 A1 | 2/2019 |
| WO | 2019100213 A1 | 5/2019 |

OTHER PUBLICATIONS

ETSI, "5G; 5G System; Access and Mobility Policy Control Service; Stage 3", 3GPP TS 29.507 V 15.4.0 Release 15 (Jul. 2019), 43 Pages.

Lenovo et al., "UE Policy configuration", S2-177244, SA WG2 Temporary Document, Oct. 23-27, 2017, 7 Pages, Ljubljana, Slovenia.

Huawei et al., "Ol#4i, Ol#4d/O##32: Tailoring UE support and removing NSSP terminology", S2-179424, SA WG2 Meeting #124, Nov. 27-Dec. 1, 2017, 14 Pages, Reno, USA.

3rd Generation Partnership Project; Technical Specification Group Services and SYstem Aspects; Procedures for the 5G System (5GS); Stage 2 (Release 16); 3GPP TS 23.502, Sep. 2019, 525 Pages, V16.2.0.

3rd Generation Partnership Project; Technical Specification Group Services and System Aspects; Study of Enablers for Network Automation for 5G(Release 16), 3GPP TR 23.791, Jun. 2019, 124 Pages, V16.2.0.

\* cited by examiner

SERVICE CONFIGURATION METHOD, COMMUNICATION APPARATUS, AND COMMUNICATION SYSTEM

CROSS-REFERENCE TO RELATED APPLICATIONS

This application is a continuation of International Application No. PCT/CN2020/117149, filed on Sep. 23, 2020, which claims priority to Chinese Patent Application No. 201910918864.4, filed on Sep. 26, 2019. The disclosures of the aforementioned applications are hereby incorporated by reference in their entireties.

TECHNICAL FIELD

This application relates to the communication field, and more specifically, to a service configuration method, a communication apparatus, and a communication system.

BACKGROUND

Currently, it is proposed that a user routing selection policy (URSP) should support an edge computing service. The edge computing service may be simply understood as that an application function (AF) may choose to dynamically deploy an application service at an edge position. For example, a live or playback service may be deployed for a stadium during a major event, to implement functions such as switching viewing angles and playing back highlights by audiences in the stadium, thereby improving viewing experience of users. Generally, because the service requires a high bandwidth and a low latency, the service may be allowed to be accessed only by users in a neighboring area.

When accessing a specific service, a terminal device needs to select a correct protocol data unit (PDU) session configuration parameter according to a URSP rule, to access a specific application service and obtain corresponding quality of service assurance. For the application service that is dynamically deployed, because any user may enter the area, if the URSP rule is configured for all users in advance, but a limited quantity of users actually need to access the service, signaling resources are wasted.

SUMMARY

This application provides a service configuration method, a communication apparatus, and a communication system, to effectively configure a URSP in a scenario in which an application service is dynamically deployed, and avoid unnecessary signaling overheads.

According to a first aspect, a service configuration method is provided. The method includes: An access management network element receives a first configuration request message from a network exposure network element, where the first configuration request message includes first area information, and the first area information is used to indicate a target area; if a target terminal device is located in the target area, the access management network element sends a user policy association request message to a policy control network element, where the user policy association request message is used to request the policy control network element to configure a first user routing selection policy URSP for the target terminal device, and the first URSP is used by the target terminal device to access a first service; and the access management network element receives the first URSP from the policy control network element, and sends the first URSP to the target terminal device.

Based on the method provided in this application, the policy control network element configures the first URSP for the target terminal device only when the target terminal device is located in the target area, so that the target terminal device can access a corresponding service based on the first URSP only when the target terminal device is located in the target area. Compared with a solution in a conventional technology in which the first URSP is configured for all target terminal devices in advance regardless of a location of the target terminal device, a URSP in the solution of this application can be effectively configured, thereby avoiding unnecessary signaling overheads.

With reference to the first aspect, in some implementations of the first aspect, the first configuration request message and the user policy association request message each further include an application identifier, and the application identifier is used to indicate an application that provides the first service.

For example, in this application, the application identifier may be an application service provider (ASP) identifier (ID), and an application service provider ASP indicated by the ASP ID provides the first service. Alternatively, the application identifier may be an application service identifier (AF Service Identifier), or may be specific application identification information.

With reference to the first aspect, in some implementations of the first aspect, the first configuration request message further includes one or more of the following: an internal group identifier, traffic descriptor information, time window information, an internal transaction identifier, a data network name (DNN), and single-network slice selection assistance information (S-NSSAI). Correspondingly, the user policy association request message further includes one or more of the following: the traffic descriptor information, the time window information, the first area information, the data network name DNN, and the single-network slice selection assistance information S-NSSAI. The internal group identifier is used to indicate all target terminal devices that are allowed to access the first service; the traffic descriptor information is used to describe the first service; the time window information is used to indicate availability time of the first service; the internal transaction identifier is used to identify a configuration request for the first service; and the DNN and the S-NSSAI are determined by the network exposure network element based on the application identifier.

Based on this solution, the access management network element may provide information used to generate the first URSP, so that the policy control network element may generate the URSP based on the information provided by the access management network element.

With reference to the first aspect, in some implementations of the first aspect, the first configuration request message and the user policy association request message each include an application identifier and an internal transaction identifier, or the first configuration request message and the user policy association request message each include an internal transaction identifier. The application identifier is used to indicate an application that provides the first service, and the internal transaction identifier is used to identify a configuration request for the first service.

Based on this solution, the policy control network element may obtain, locally or from a data storage network element based on the application identifier and the internal transaction identifier or based on the internal transaction identifier, information used to generate the URSP, and the policy control network element may generate the URSP based on the obtained information.

With reference to the first aspect, in some implementations of the first aspect, before the access management network element sends the user policy association request message to the policy control network element, the access management network element may further compare current location information of each terminal device served by the access management network element with the first area information, to determine a terminal device in the target area.

According to a second aspect, a service configuration method is provided. The method includes: A policy control network element receives a user policy association request message from an access management network element, where the user policy association request message includes an application identifier, and the application identifier is used to indicate an application that provides a first service; the policy control network element generates a first user routing selection policy URSP based on the user policy association request message, where the first URSP is used by a target terminal device to access the first service; and the policy control network element sends the first URSP to the target terminal device.

Optionally, the policy control network element may send the first URSP to a terminal device by using the access management network element.

Based on the method provided in this application, the policy control network element configures the first URSP for the target terminal device only when the target terminal device is located in a target area, so that the target terminal device can access a corresponding service based on the first URSP only when the target terminal device is located in the target area. Compared with a solution in a conventional technology in which the first URSP is configured for all target terminal devices in advance regardless of a location of the target terminal device, a URSP in the solution of this application can be effectively configured, thereby avoiding unnecessary signaling overheads.

With reference to the second aspect, in some implementations of the second aspect, the user policy association request message further includes one or more of the following: traffic descriptor information, time window information, first area information, a data network name DNN, and single-network slice selection assistance information S-NSSAI. The traffic descriptor information is used to describe the first service; the time window information is used to indicate availability time of the first service; the first area information is used to indicate the target area; and the DNN and the S-NSSAI are determined based on the application identifier.

According to a third aspect, a service configuration method is provided. The method includes: A policy control network element obtains policy configuration information, where the policy configuration information includes an application identifier, and the application identifier is used to indicate an application that provides a first service; the policy control network element receives a user policy association request message from an access management network element, where the user policy association request message is used to request the policy control network element to configure a first user routing selection policy URSP for a target terminal device, the first URSP is used by the target terminal device to access the first service, and the target terminal device is located in a target area; the policy control network element generates the first URSP based on the policy configuration information; and the policy control network element sends the first URSP to the target terminal device.

Optionally, the policy control network element may send the first URSP to a terminal device by using the access management network element.

Based on the method provided in this application, the policy control network element may obtain the policy configuration information, and when the target terminal device is located in the target area, configure the first URSP for the target terminal device based on the policy configuration information, so that the target terminal device can access a corresponding service based on the first URSP only when the target terminal device is located in the target area. Compared with a solution in a conventional technology in which the first URSP is configured for all target terminal devices in advance regardless of a location of the target terminal device, a URSP in the solution of this application can be effectively configured, thereby avoiding unnecessary signaling overheads.

With reference to the third aspect, in some implementations of the third aspect, that a policy control network element obtains policy configuration information includes: The policy control network element receives a policy configuration request message from a network exposure network element, where the policy configuration request message includes the policy configuration information, or the policy control network element obtains the policy configuration information from a data storage network element.

Herein, the policy configuration information is sent by the network exposure network element to the data storage network element.

Based on this solution, the network exposure network element may configure the policy configuration information for the policy control network element. Alternatively, the network exposure network element may configure the policy configuration information for the data storage network element, and the policy control network element may obtain the policy configuration information from the data storage network element.

With reference to the third aspect, in some implementations of the third aspect, the policy configuration information further includes one or more of the following: an internal group identifier, traffic descriptor information, time window information, an internal transaction identifier, first area information, a data network name DNN, and single-network slice selection assistance information S-NSSAI. The internal group identifier is used to indicate all target terminal devices that are allowed to access the first service; the traffic descriptor information is used to describe the first service; the time window information is used to indicate availability time of the first service; the internal transaction identifier is used to identify a configuration request for the first service; the first area information is used to indicate the target area, and the target area is an area in which the target terminal device is allowed to access the first device; and the DNN and the S-NSSAI are determined based on the application identifier.

With reference to the third aspect, in some implementations of the third aspect, the user policy association request message includes the application identifier and/or the internal transaction identifier, and the internal transaction identifier is used to identify a configuration request for the first service.

According to a fourth aspect, a service configuration method is provided. The method includes: A policy control network element obtains policy configuration information, where the policy configuration information includes first area information and an application identifier, the first area information is used to indicate a target area, and the application identifier is used to indicate an application that provides a first service; the policy control network element receives location indication information from an access management network element; if determining that a target terminal device is located in the target area based on the location indication information, the policy control network element generates a first user routing selection policy URSP based on the policy configuration information; and the policy control network element sends the first URSP to the target terminal device, where the first URSP is used by the target terminal device to access the first service.

Optionally, the location indication information is used to indicate a current location of the target terminal device, or the location indication information is used to indicate that the target terminal device enters or leaves the target area.

Optionally, the access management network element may send the first URSP to a terminal device by using the access management network element.

Based on the method provided in this application, when the target terminal device is located in the target area, the policy control network element may configure the first URSP for the target terminal device based on the policy configuration information, so that the target terminal device can access a corresponding service based on the first URSP only when the target terminal device is located in the target area. Compared with a solution in a conventional technology in which the first URSP is configured for all target terminal devices in advance regardless of a location of the target terminal device, a URSP in the solution of this application can be effectively configured, thereby avoiding unnecessary signaling overheads.

With reference to the fourth aspect, in some implementations of the fourth aspect, the policy configuration information further includes one or more of the following: an internal group identifier, traffic descriptor information, time window information, an internal transaction identifier, a data network name DNN, and single-network slice selection assistance information S-NSSAI. The internal group identifier is used to indicate all target terminal devices that are allowed to access the first service; the traffic descriptor information is used to describe the first service; the time window information is used to indicate availability time of the first service; the internal transaction identifier is used to identify a configuration request for the first service; and the DNN and the S-NSSAI are determined based on the application identifier.

With reference to the fourth aspect, in some implementations of the fourth aspect, that a policy control network element obtains policy configuration information includes: The policy control network element receives a first configuration request message from a network exposure network element, where the first configuration request message includes the policy configuration information, or the policy control network element obtains the policy configuration information from a data storage network element.

Herein, the policy configuration information is sent by the network exposure network element to the data storage network element.

With reference to the fourth aspect, in some implementations of the fourth aspect, the location indication information is used to indicate a current location of the target terminal device. That the policy control network element receives location indication information from an access management network element includes: The policy control network element receives a policy control request message from the access management network element, where the policy control request message includes the location indication information, and the policy control request message is a policy control establishment request message or a policy control update request message.

With reference to the fourth aspect, in some implementations of the fourth aspect, the location indication information is used to indicate that the target terminal device enters or leaves the target area; and before that the policy control network element receives location indication information from an access management network element, the method further includes: The policy control network element sends an event subscription request message to the access management network element, where the event subscription request message is used to indicate the target terminal device to send the location indication information to the policy control network element when the target terminal device enters or leaves the target area.

According to a fifth aspect, a service configuration method is provided. The method includes: An application network element generates a second configuration request message, where the second configuration request message includes an application identifier and second area information, the application identifier is used to indicate an application that provides a first service, the second area information is used to indicate a target area, and the second service configuration request message is used to configure a target terminal device in the target area to access the first service; and the application network element sends the second configuration request message to a network exposure network element.

Based on the method provided in this application, the application network element configures the first service for the network exposure network element, so that the network exposure network element may send related configuration to a policy control network element, an access management network element, or a data storage network element, to enable the policy control network element to configure a first URSP for the target terminal device based on policy configuration information when the target terminal device is located in the target area.

Optionally, the second configuration request message further includes one or more of the following: an external group identifier, traffic descriptor information, time window information, and an external transaction identifier. The external group identifier is used to indicate a plurality of terminal devices that are allowed to access the first service, and the target terminal device is any one of the plurality of terminal devices; the traffic descriptor information is used to describe a service flow of the first service; the time window information is used to indicate availability time of the first service; and the external transaction identifier is used to identify the second service configuration request message.

According to a sixth aspect, a service configuration method is provided. The method includes: A network exposure network element receives a second configuration request message from an application network element, where the second configuration request message includes an application identifier and second area information, the application identifier is used to indicate an application that provides a first service, the second area information is used to indicate a target area, and the second configuration request message is used to configure a target terminal device in the target area to access the first service; and the network exposure network element generates a first configuration request message based on the second configuration request message, and sends the first configuration request message to an access management network element, where the first configuration request message includes first area information and the application identifier, the first area information is used to indicate the target area, and the first area information is determined based on the second area information.

Based on the method provided in this application, when the target terminal device is located in the target area, the access management network element may request, based on the first configuration request message sent by the network exposure network element, a first URSP from a policy control network element. Correspondingly, the policy control network element may configure the first URSP for the target terminal device when the target terminal device is located in the target area, so that the target terminal device in the target area can access the first service.

Optionally, the second configuration request message further includes one or more of the following: an external group identifier, traffic descriptor information, time window information, and an external transaction identifier. The first configuration request message further includes one or more of the following: an internal group identifier, the traffic descriptor information, the time window information, an internal transaction identifier, a data network name DNN, and single-network slice selection assistance information S-NSSAI. Both the external group identifier and the internal group identifier are used to indicate all target terminal devices that are allowed to access the first service, and the internal group identifier is determined based on the external group identifier; the traffic descriptor information is used to describe a service flow of the first service; the time window information is used to indicate availability time of the first service; and the external transaction identifier is used to identify the second configuration request message, the internal transaction identifier is used to identify the first configuration request message, and the internal transaction identifier is determined based on the external transaction identifier.

According to a seventh aspect, a service configuration method is provided. The method includes: A network exposure network element receives a second configuration request message from an application network element, where the second configuration request message includes an application identifier and second area information, the application identifier is used to indicate an application that provides a first service, the second area information is used to indicate a target area, and the second configuration request message is used to configure a target terminal device in the target area to access the first service; and the network exposure network element generates a first configuration request message and a policy configuration request message based on the second configuration request message, sends the policy configuration request message to a policy control network element or a data storage network element, and sends the first configuration request message to an access management network element, where the first configuration request message includes first area information, and the policy configuration request message includes the application identifier.

Based on the method provided in this application, when the target terminal device is located in the target area, the access management network element may request, based on the first configuration request message sent by the network exposure network element, a first URSP from the policy control network element. Correspondingly, when the target terminal device is located in the target area, the policy control network element may generate and then configure the first URSP for the target terminal device based on the policy configuration request message, so that the target terminal device in the target area can access the first service.

Optionally, the second configuration request message further includes one or more of the following: an external group identifier, traffic descriptor information, time window information, and an external transaction identifier. The first configuration request message and/or the policy configuration request message further include/includes one or more of the following: an internal group identifier, the traffic descriptor information, the time window information, an internal transaction identifier, a data network name DNN, and single-network slice selection assistance information S-NSSAI. Both the external group identifier and the internal group identifier are used to indicate all target terminal devices that are allowed to access the first service, and the internal group identifier is determined based on the external group identifier; the traffic descriptor information is used to describe a service flow of the first service; the time window information is used to indicate availability time of the first service; and the external transaction identifier is used to identify the second configuration request message, the internal transaction identifier is used to identify the first configuration request message, and the internal transaction identifier is determined based on the external transaction identifier.

According to an eighth aspect, a service configuration method is provided. The method includes: A network exposure network element receives a second configuration request message from an application network element, where the second configuration request message includes an application identifier and second area information, the application identifier is used to indicate an application that provides a first service, the second area information is used to indicate a target area, and the second configuration request message is used to configure a target terminal device in the target area to access the first service; and the network exposure network element generates a policy configuration request message based on the second configuration request message, and sends the policy configuration request message to a policy control network element, where the policy configuration request message includes first area information and the application identifier.

Based on the method provided in this application, when the target terminal device is located in the target area, the policy control network element may generate and then configure a first URSP for the target terminal device based on the policy configuration request message, so that the target terminal device in the target area can access the first service.

Optionally, the second configuration request message further includes one or more of the following: an external group identifier, traffic descriptor information, time window information, and an external transaction identifier. The policy configuration request message further includes one or more of the following: an internal group identifier, the traffic descriptor information, the time window information, an internal transaction identifier, a data network name DNN, and single-network slice selection assistance information S-NSSAI. Both the external group identifier and the internal group identifier are used to indicate all target terminal devices that are allowed to access the first service, and the internal group identifier is determined based on the external group identifier; the traffic descriptor information is used to describe a service flow of the first service; the time window information is used to indicate availability time of the first service; and the external transaction identifier is used to identify the second configuration request message, the internal transaction identifier is used to identify a first configuration request message, and the internal transaction identifier is determined based on the external transaction identifier.

According to a ninth aspect, a communication apparatus is provided. The communication apparatus includes modules or units configured to perform the method according to any one of the first aspect to the eighth aspect and the possible implementations of the first aspect to the eighth aspect.

According to a tenth aspect, a communication apparatus is provided. The communication apparatus includes a processor. The processor is coupled to a memory, and may be configured to execute instructions in the memory, to implement the method according to any one of the first aspect to the eighth aspect and the possible implementations of the first aspect to the eighth aspect. Optionally, the communication apparatus further includes the memory. Optionally, the communication apparatus further includes a communication interface, and the processor is coupled to the communication interface.

According to an eleventh aspect, a processor is provided. The processor includes an input circuit, an output circuit, and a processing circuit. The processing circuit is configured to: receive a signal through the input circuit, and transmit the signal through the output circuit, to enable the processor to perform the method according to any one of the first aspect to the eighth aspect and the possible implementations of the first aspect to the eighth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in embodiments of this application.

According to a twelfth aspect, a processing apparatus is provided. The processing apparatus includes a processor and a memory. The processor is configured to: read instructions stored in the memory, receive a signal through a receiver, and transmit the signal through a transmitter, to perform the method according to any one of the first aspect to the eighth aspect and the possible implementations of the first aspect to the eighth aspect.

Optionally, there are one or more processors, and there are one or more memories.

Optionally, the memory may be integrated with the processor, or the memory and the processor are separately disposed.

In a specific implementation process, the memory may be a non-transitory memory, for example, a read-only memory (ROM). The memory and the processor may be integrated into a same chip, or may be separately disposed on different chips. A type of the memory and a manner of disposing the memory and the processor are not limited in embodiments of this application.

The processing apparatus in the twelfth aspect may be one or more chips. The processor in the processing apparatus may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory. The memory may be integrated inside the processor, or may be located outside the processor and exist independently.

According to a thirteenth aspect, a computer program product is provided. The computer program product includes a computer program (which may also be referred to as code or an instruction), and when the computer program is run, a computer is enabled to perform the method according to any one of the first aspect to the eighth aspect and the possible implementations of the first aspect to the eighth aspect.

According to a fourteenth aspect, a computer-readable storage medium is provided. The computer-readable storage medium stores a computer program (which may also be referred to as code or an instruction), and when the computer program is run on a computer, the computer is enabled to perform the method according to any one of the first aspect to the eighth aspect and the possible implementations of the first aspect to the eighth aspect.

According to a fifteenth aspect, a communication system is provided. The communication system includes at least two network elements of the foregoing policy control network element, the access management network element, the data storage network element, the application network element, and the network exposure network element. Optionally, the communication system may further include the foregoing target terminal device.

DETAILED DESCRIPTION OF ILLUSTRATIVE EMBODIMENTS

The following describes technical solutions of this application with reference to the accompanying drawings.

The technical solutions in embodiments of this application may be applied to a 5th generation (5G) system or a new radio (NR) communication system, or may be applied to another communication system that may appear in the future, for example, a 6G communication system.

Figure 1:
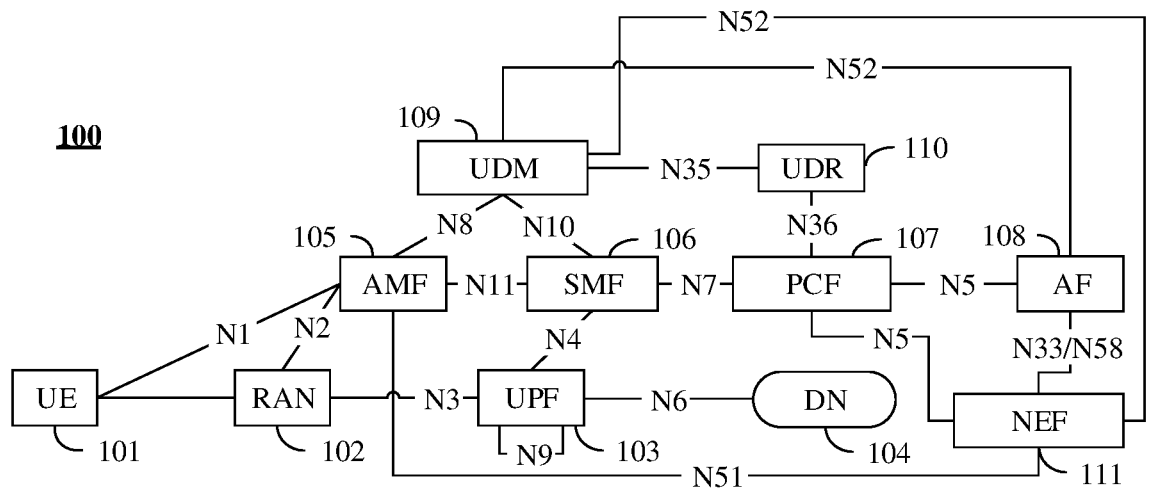
FIG. 1 is a schematic block diagram of a system architecture.

FIG. 1 is a schematic diagram of a 5G system architecture. As shown in FIG. 1, the system architecture may include user equipment (UE) 101, a radio access network (RAN) network element 102, a policy control function 103, a data network (DN) 104, an access and mobility management function (AMF) 105, a session management function (SMF) 106, a policy control function (PCF) 107, an application function (AF) 108, unified data management (UDM) 109, a unified data repository (UDR) 110, and a network exposure function (NEF) in. The following separately describes the network elements in the network architecture.

1. UE may also be referred to as a terminal device. The terminal device may communicate with one or more core networks (CNs) by using a RAN network element. The terminal device may also be referred to as an access terminal, a terminal, a subscriber unit, a subscriber station, a mobile station, a remote station, a remote terminal, a mobile device, a user terminal, a wireless network device, a user agent, or a user apparatus. The terminal may be a cellular phone, a cordless phone, a session initiation protocol (SIP) phone, a wireless local loop (WLL) station, a personal digital assistant (PDA), a handheld device having a wireless communication function, a computing device, another device connected to a wireless modem, a vehicle-mounted device, a wearable device, a terminal device in an internet of things or a vehicle network, any form of terminal device in a future network, or the like.

2. A RAN network element is a device that connects UE to a wireless network. The RAN network element may be a base station NodeB, an evolved NodeB (eNB), or a next generation NodeB (gNB) in a 5G mobile communication system, a transmission point, a base station in a future mobile communication system, an access node in a wireless fidelity (Wi-Fi) system, or one antenna panel or a group of antenna panels (including a plurality of antenna panels) of a base station in a 5G system. Alternatively, the radio access network device may be a network node that constitutes a gNB or a transmission point, for example, a baseband unit (BBU), a distributed unit (DU), a centralized unit (CU), or a centralized unit control plane (CU-CP) and a centralized unit user plane (CU-UP). A specific technology and a specific device form that are used by the radio access network device are not limited in embodiments of this application. In some deployments, the gNB may include a CU and a DU. One CU may be connected to one DU, or a plurality of DUs may share one CU. This can reduce costs and facilitate network expansion. The CU implements some functions of the gNB, and the DU implements some functions of the gNB. For example, the CU is responsible for processing a non-real-time protocol and service, to implement functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. Division of the CU and the DU may be performed based on a protocol stack. The embodiments of this application are not completely limited to the foregoing division manner that is based on the protocol stack, and there may be another division manner. For details, refer to TR38.801 v14.0.0.

The CU and the DU are connected through an F1 interface. The CU indicates that the gNB is connected to a core network through an Ng interface. Further, the centralized unit CU may be further divided into a control plane (CU-CP) and a user plane (CU-UP). The CU-CP is responsible for a control plane function, and mainly includes RRC and a packet data convergence protocol control (PDCP-C) plane. The PDCP-C is mainly responsible for at least one of functions such as data encryption and decryption, integrity protection, and data transmission on the control plane. The CU-UP is responsible for a user plane function, and mainly includes a service data adaptation protocol (SDAP) and a packet data convergence protocol user (PDCP-U) plane. The SDAP is mainly responsible for processing data of the core network and mapping a flow to a bearer. The PDCP-U layer is mainly responsible for at least one of functions such as encryption and decryption, integrity protection, header compression, serial number maintenance, and data transmission on a data plane. The CU-CP is connected to the CU-UP through an E1 interface. The CU-CP indicates that the gNB is connected to the core network through the Ng interface. The CU-CP is connected to the DU through F1-C (a control plane). The CU-UP is connected to the DU through F1-U (a user plane). Certainly, in another possible implementation, the PDCP-C is on the CU-UP.

The gNB may further include an active antenna unit (AAU). The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU, or being sent by the DU and the AAU. It may be understood that a network device may be a device including one or more of a CU node, a DU node, a CU-CP node, a CU-UP node, and an AAU node. In addition, the CU may be used as a network device in an access network, or may be used as a network device in the core network (CN). This is not limited in this application.

3. A UPF is a user plane network element, and is used for packet routing and forwarding, performing quality of service (QoS) processing on user plane data, performing packet detection, executing a policy rule, and so on.

4. A DN is a network used to provide data transmission, for example, the internet. The DN may be data network authentication, authorization, and accounting (data network authentication, authorization, accounting), an application server (application function, AF), or the like.

5. An AF is an application network element, and mainly transfers a requirement of an application side on a network side, for example, a quality of service (QoS) requirement. The AF may be a third-party function entity, or may be an application service deployed by an operator, for example, an IP multimedia subsystem (IMS) voice call service.

6. An AMF is an access management network element, and is mainly used for session management, internet protocol (IP) address assignment and management of UE, selection and management of a UPF network element, exchange of session information related to an access network by using the AMF, an end point of a policy control and charging function interface, downlink data notification, and the like.

7. An NEF is a network exposure network element, and is configured to securely expose, to the outside, a service, a capability, and the like that are provided by a 3GPP network function.

8. An NRF is a network storage network element, and is configured to store description information of a network function entity and description information of a service provided by the network function entity, support service discovery and network element entity discovery, and so on.

9. A PCF is a policy control network element, and is configured to: guide a unified policy framework of network behavior, provide policy rule information for a control plane function network element (such as an AMF or an SMF network element), and so on.

10. UDM is a data management network element, and is configured to implement functions such as user identifier processing, access authentication, registration, and mobility management.

11. A UDR is a data storage network element, and is mainly responsible for an accessing function of various types of data such as subscription data, policy data, and application data.

It may be understood that the foregoing network elements may be hardware devices, chips, software functions run on dedicated hardware, or virtualized functions instantiated on a platform (for example, a cloud platform). It should be further understood that some network elements shown in FIG. 1 may be deployed at a same location (for example, on a same hardware device or a software function), or may be separately deployed. This is not limited in this application.

It should be understood that the interface between the network elements shown in FIG. 1 is merely an example. In practice, the interface between the network elements may change. For example, the network elements may communicate with each other through a service-oriented interface.

It should be further understood that the foregoing network elements such as the access management network element, the network exposure network element, the policy control network element, the application network element, and the data storage network element may have different names in different systems. For example, the access management network element may be an AMF in a 5G system, but may not be the AMF in a 6G system. A person skilled in the art may understand that different names of the network elements shall not constitute any limitation on this application.

For ease of understanding, the solutions provided in this application are described below by using an example in which the access management network element is an AMF, the network exposure network element is an NEF, the policy control network element is a PCF, the application network element is an AF, and the data storage network element is a UDR.

Currently, it is proposed that a URSP should support an edge computing service. The edge computing service may be simply understood as that an AF may choose to dynamically deploy an application service at an edge position. For example, a live or playback service may be deployed for a stadium during a major event, to implement functions such as switching viewing angles and playing back highlights by audiences in the stadium, thereby improving viewing experience of users. Generally, because the service requires a high bandwidth and a low latency, the service may be allowed to be accessed only by users in a neighboring area.

When accessing a specific service, a terminal device needs to select a correct PDU session configuration parameter, for example, information such as DNN information or S-NSSAI, according to a URSP rule, to access a specific application service and obtain corresponding quality of service assurance. For the application service that is dynamically deployed, because any user may enter the area, if the URSP rule is configured for all users in advance, but a limited quantity of users actually need to access the service, signaling resources are wasted.

To resolve a problem that the URSP cannot be effectively configured in a scenario in which an application service is dynamically deployed, this application provides a service configuration method. The following describes the solutions provided in this application. It should be understood that an execution sequence of the method provided in this application is determined only by internal logic of the method, and is not limited by reference numerals in the accompanying drawings corresponding to the embodiments.

Figure 2:
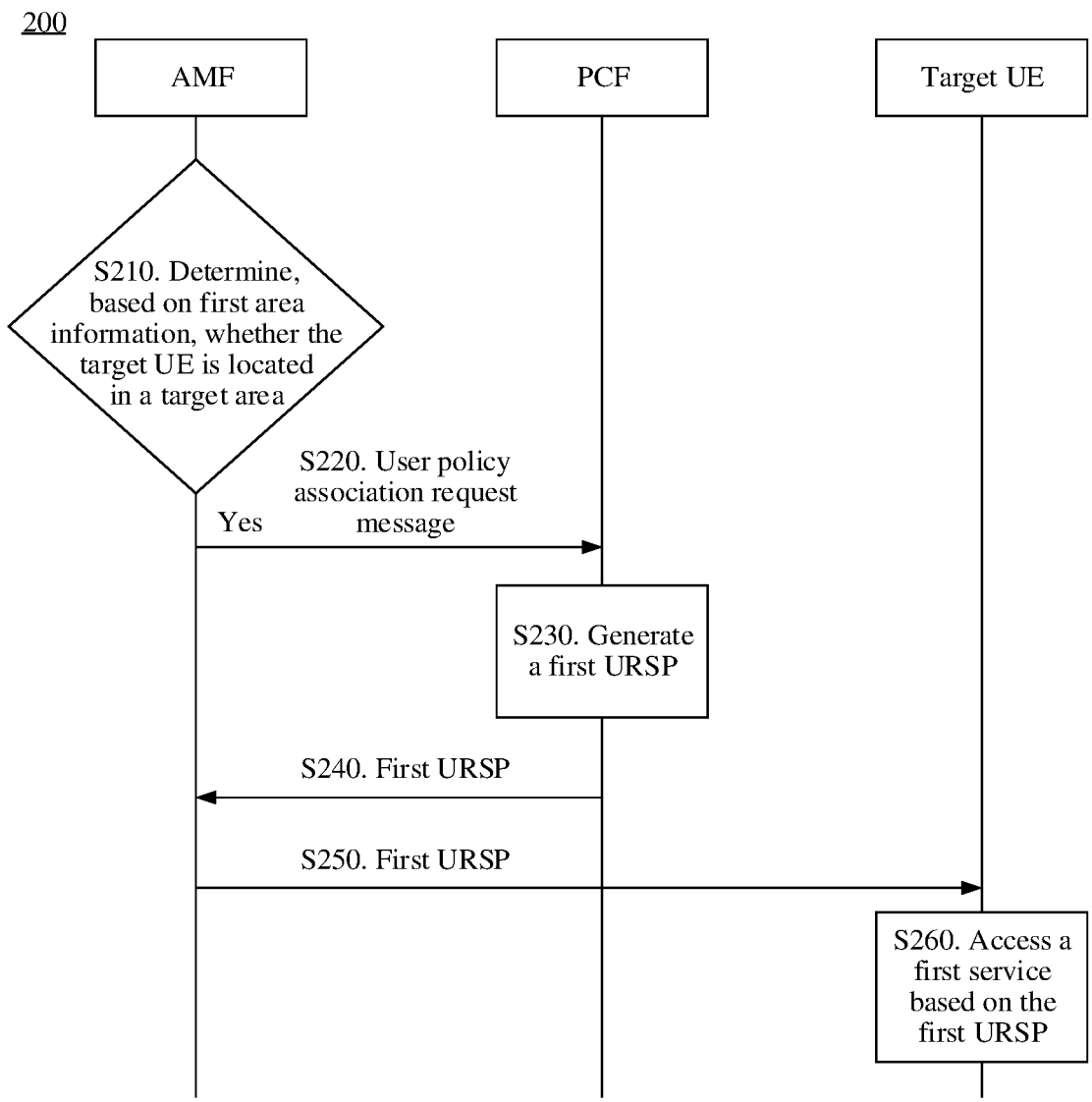
FIG. 2 is a schematic flowchart of a service configuration method according to this application.

FIG. 2 is a schematic flowchart of a service configuration method according to this application. As shown in FIG. 2, the method 200 may include S210 to S260. The following separately describes the steps.

S210. An AMF determines, based on first area information, whether target UE is located in a target area.

The first area information is used to indicate the target area. The first area information may be configured by an AF for the AMF by using an NEF.

The target UE may be any UE in a network, or may be some specific UEs. The specific UEs may be configured by the AF for the AMF by using the NEF.

S220. If the target UE is located in the target area, the AMF sends a user policy association request message to a PCF.

The user policy association request message is used to request the PCF to configure a first URSP for the target UE, and the first URSP is used by the target UE to access a first service. For example, in this application, the user policy association request message may be a user policy association establishment request message or a user policy association update request message.

It should be understood that, that the target UE is located in the target area may mean that the target UE enters the target area or the target UE is already located in the target area.

S230. The PCF generates the first URSP.

The PCF may generate the first URSP based on an application identifier, where an application indicated by the application identifier provides the first service, or the application identifier is used to indicate an application that provides the first service.

For example, in this application, the application identifier may be an application service provider (ASP) identifier (ID), and an application service provider ASP indicated by the ASP ID provides the first service. Alternatively, the application identifier may be an application service identifier (AF Service Identifier), or may be specific application identification information.

In the following, for ease of understanding, the ASP ID instead of the application identifier is used for description.

For example, the first URSP may include traffic descriptor (TD) information and route selection descriptor information.

The traffic descriptor information is used to describe a service flow of the first service, and may be an APP ID or an IP triplet (a destination address, a destination port number, and a protocol type) that corresponds to the first service, or may be domain name descriptor information or the like. For a specific form, refer to a traffic descriptor form in a URSP in a conventional technology. It should be understood that the foregoing application identifier may be understood as a same concept between an operator and the ASP, while the APP ID herein may be understood as a same concept between the UE and the operator. For example, the APP ID may be a subapplication provided by the ASP.

The route selection descriptor information may include one or more of the following.

(1) Time window (TW) information: The time window information may be considered as a time verification criterion for the route selection descriptor information, and is used to indicate a validity period of the route selection descriptor information, that is, the route selection descriptor information is considered to be valid only in a time window.

(2) First area information: The area information may be considered as a location verification criterion for the route selection descriptor information, and is used to indicate a validity location of the route selection descriptor information, that is, the route selection descriptor information is considered to be valid only in the area.

(3) DNN and S-NSSAI: The DNN and the S-NSSAI may be obtained by the NEF based on the ASP ID and configuration information of a local operator, or may be obtained by the PCF based on the ASP ID and/or the traffic descriptor information, and the configuration information of the local operator, or configuration information in a UDR.

In an implementation, the user policy association request message may include the ASP ID. Optionally, the user policy association request message may further include one or more of the following: the traffic descriptor information, the time window information, the first area information, the DNN, and the S-NSSAI. That is, the AMF may provide the ASP ID and any one of the traffic descriptor information, the time window information, the first area information, the DNN, and the S-NSSAI. In addition, if the user policy association request message does not include the DNN or the S-NSSAI, the PCF may further determine the DNN and the S-NSSAI based on the ASP ID and/or the traffic descriptor information, and the configuration information of the local operator, or the configuration information in the UDR.

In another implementation, the PCF may obtain the ASP ID locally or from the UDR. The PCF may further obtain the traffic descriptor information and/or the time window information locally or from the UDR, and may obtain the first area information locally, from the UDR, or from the AMF. The foregoing information in the PCF and the foregoing information in the UDR are configured by the AF by using the NEF. In addition, the NEF may map the ASP ID based on the configuration information of the local operator, to obtain the DNN and the S-NSSAI, so that the PCF may further obtain the DNN and the S-NSSAI from the NEF. If the NEF does not perform the mapping from the ASP ID to the DNN and the S-NSSAI, the PCF may obtain the DNN and the N-SSAI based on the ASP ID and/or the traffic descriptor information, and the configuration information of the local operator, or the configuration information in the UDR.

Optionally, in an implementation, in S220, if a current time point is in the time window indicated by the time window information, the AMF sends the user policy association request message to the PCF when the target UE is located in the target area. That is, if the target UE is located in the target area outside the time window indicated by the time window information, the AMF may not send the user policy association request message to the PCF. Correspondingly, in S230, the PCF does not need to determine whether time at which the AMF sends the user policy association request message falls within the time window.

Optionally, in another specific implementation, in S220, regardless of whether a current time point is in the time window indicated by the time window information, the AMF may send the user policy association request message to the PCF only when the target UE is located in the target area. The PCF may determine, based on time at which the user policy association request message is received, whether to perform S230. If the PCF receives the user policy association request message in the time window indicated by the time window information, the PCF performs S230; otherwise, the PCF does not perform S230. In addition, the PCF may not determine whether time at which the AMF sends the user policy association request message falls within the time window, while the UE determines, based on time window information in a URSP policy, whether to currently execute the first URSP policy.

S240. The PCF sends the first URSP to the AMF.

S250. The AMF sends the first URSP to the target UE.

For example, the PCF may send the first URSP to the UE by using the AMF through a UE configuration update process.

S260. The target UE accesses the first service based on the first URSP.

Specifically, after receiving the first URSP, the target UE performs a URSP matching process when initiating the first service corresponding to the first URSP, matches the first URSP based on the traffic descriptor information corresponding to the first service, and then initiates a PDU session establishment process or a PDU session modification process based on the route selection descriptor information in the matched first URSP.

Based on the method provided in this application, the PCF configures the first URSP for the UE only when the target UE is located in the target area, so that the target UE can access a corresponding service based on the first URSP only when the target UE is located in the target area. Compared with a solution in a conventional technology in which the first URSP is configured for all target UEs in advance regardless of a location of the target UE, a URSP in the solution of this application can be effectively configured, thereby avoiding unnecessary signaling overheads.

It should be understood that, for content that has been explained and described in the foregoing, if there is no special description in the following, reference may be made to the foregoing descriptions.

The following describes the method shown in FIG. 2 in more detail with reference to detailed flowcharts shown in FIG. 3 to FIG. 5A and FIG. 5B.

Figure 3:
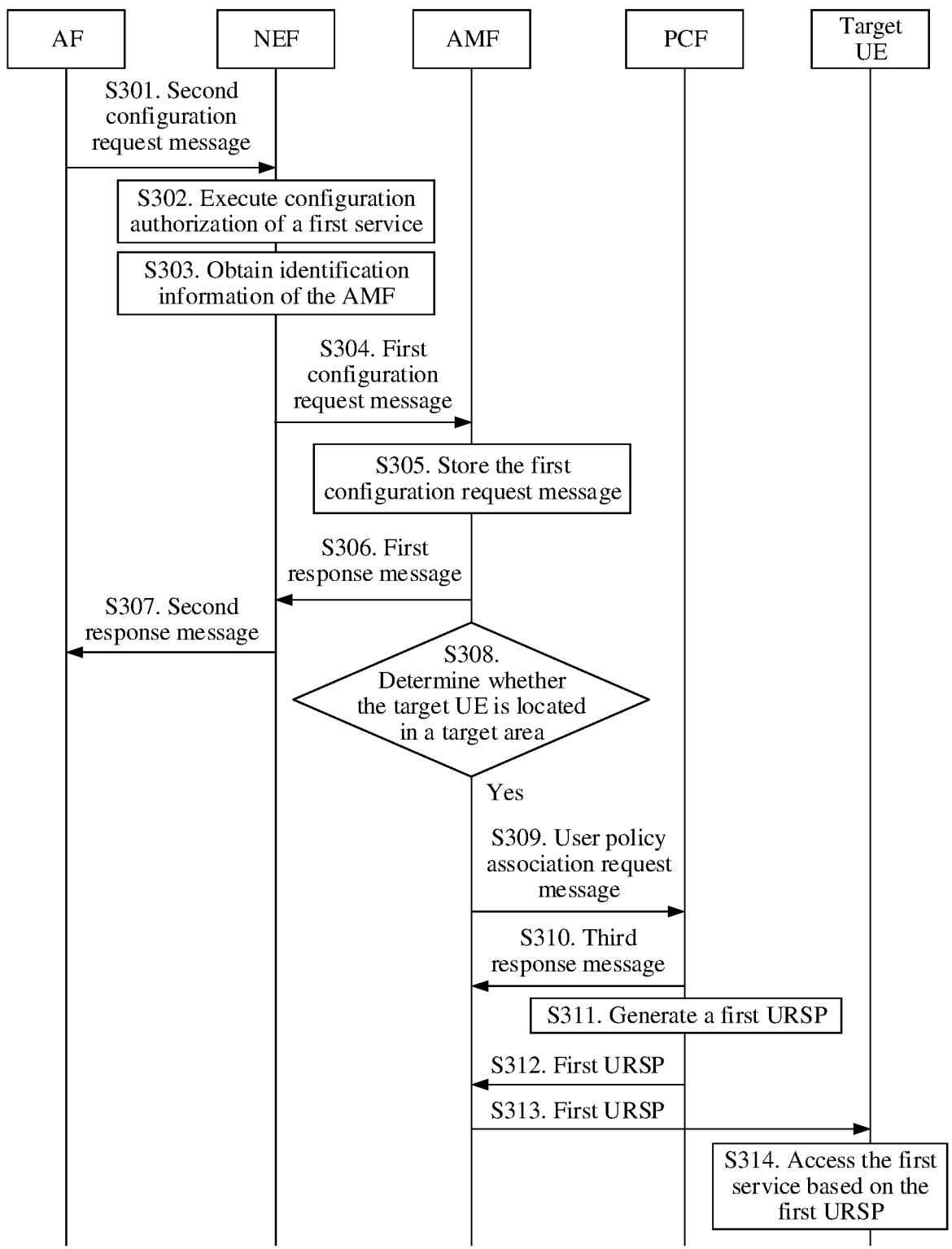
FIG. 3 is a schematic flowchart of a specific example of a service configuration method according to this application.

In the method shown in FIG. 3, when determining that the target UE is located in the target area, the AMF provides information used to generate the first URSP for the PCF. A difference from the method shown in FIG. 3 lies in that, in the method shown in FIG. 4, the NEF notifies the PCF of the information used to generate the first URSP, and in the method shown in FIG. 5A and FIG. 5B, the NEF notifies the UDR of the information used to generate the first URSP, and then the UDR provides the information for the PCF. The method shown in FIG. 3 may correspond to the first manner described in S230, and the methods shown in FIG. 4 and FIG. 5A and FIG. 5B may correspond to the second manner described in S230.

FIG. 3 is a schematic flowchart of a service configuration method. As shown in FIG. 3, the method 300 may include some or all of S301 to S314. The following separately describes the steps.

S301. An AF sends a second configuration request message to an NEF.

For example, the AF may send the second configuration request message in a case in which a new application is deployed. For example, a VR experience service is newly deployed in a virtual reality (virtual reality, VR) experience venue, and the second configuration request message is sent to allow a user in the venue to access and use the service by using a mobile phone. To ensure user experience, the service needs to be accessed by using a specific DNN/specific S-NSSAI. That is, the AF needs to notify an operator to configure a corresponding URSP for a target user before the user accesses the experience service. For another example, the AF may send the second configuration request message when an ASP adds a new application access point to a specific local access data network (local access data network, LADN). The ASP adds the new application access point to the specific LADN, so that UE is allowed to access an application service through a local branch to reduce user plane path loopback. In this case, the ASP can provide LADN information for the UE by using a URSP of an operator network, so that the UE can access the application service by using a correct LADN network.

The second service configuration request message is used to configure target UE in a target area to access a first service. Specifically, the second service configuration request message may include the foregoing ASP ID and information (denoted as second area information in this application) that is used to indicate the target area. The second area information may be external geographic area information (Geo Info), but this is not limited in this application.

Optionally, the second configuration request message may further carry an external group identifier, and the external group identifier is used to indicate all target UEs that are allowed to access the first service. For example, if the second configuration request message does not include the external group identifier, the target UE may be any UE in a network.

Optionally, the second configuration request message may further include one or more of the following:
(1) the foregoing traffic descriptor information;
(2) the foregoing time window information; and
(3) an external transaction identifier. The external transaction identifier is used to uniquely identify a configuration request for the first service, so that the external transaction identifier is subsequently sent to the NEF to request to update or cancel the configuration request for the first service. The configuration request for the first service is configuration information related to the first service or a configuration request message related to the first service.

S302. The NEF executes configuration authorization of the first service based on the second configuration request message.

Specifically, the NEF determines, based on the ASP ID, whether the ASP indicated by the ASP ID allows sending the configuration request (that is, a first configuration request message) for the first service. If yes, the second area information is mapped to one or more of the following: internal location information of the operator network, a list of cell identifiers (List of Cell id(s)), list of RAN devices (List of gNodeB(s)), and a list of tracking area identifiers (tracking area identifiers, TAIs) (List of TAI(s)). The foregoing information obtained by mapping the second area information may be collectively referred to as first area information. It is easy to understand that an area indicated by the first area information is the same as an area indicated by the second area information, that is, both the areas are target areas.

If the second configuration request message further includes the external group identifier, the NEF may further map the external group identifier to an internal group identifier (IGI). It should be understood that UE indicated by the external group identifier is the same as UE indicated by the internal group identifier.

If the second configuration request message further includes the external transaction identifier, the NEF may further map the external transaction identifier to an internal transaction identifier (ITI).

Optionally, the NEF may further map the ASP ID to a DNN and S-NSSAI based on the configuration information of the operator.

S303. The NEF obtains identification information of an AMF (or information about a set of AMFs) that provides a service for the target area.

In a manner, the NEF may obtain through mapping the identification information of the AMF based on the second area information.

In another implementation, the NEF may send the first area information to UDM; and the UDM may determine, based on a mapping relationship between the first area information and an AMF identifier, the identification information of the AMF that provides the service for the area, and then the UDM may send the identification information of the AMF to the NEF.

S304. The NEF sends the first configuration request message to the AMF identified by the identification information of the AMF.

The first configuration request message includes the ASP ID and the first area information.

Optionally, if the second configuration request message further includes the traffic descriptor information, the first configuration request message may further include the traffic descriptor information. Similarly, if the first configuration request message further includes the time window information, the first configuration request message may further include the time window information. If the second configuration request message includes the external transaction identifier, the first configuration request message may further include the internal transaction identifier. If the second configuration request message includes the external group identifier, the first configuration request message may further include the internal group identifier.

Optionally, the first configuration request message may further include a DNN and S-NSSAI.

It should be noted that the NEF may be an intermediate NEF (I-NEF) deployed in a visited network, or may be an NEF in a home network. If the NEF is the I-NEF deployed in the visited network, a process is basically the same as a process in a non-roaming scenario. If the NEF is the NEF in the home network, after the NEF sends the second configuration request message, the second configuration request message is forwarded to the AMF in the visited network by using the I-NEF.

S305. The AMF stores the received first configuration request message.

S306. The AMF sends a first response message to the NEF. The first response message is used to indicate that the AMF successfully receives the first configuration request message.

S307. The NEF sends a second response message to the AF. The second response message is used to indicate that the NEF successfully receives the second configuration request message.

It should be understood that S306 and S307 are optional steps. An execution sequence of S306 and S307 is not limited. In addition, S307 may alternatively be performed before S302 or S303.

S308. The AMF determines whether the target UE is located in the target area.

Specifically, the AMF compares the first area information in the first configuration request message with current location information of the target UE served by the AMF. If one target UE is located in the target area, the AMF initiates a process shown in S309 to S314 for the target UE. Otherwise, the process is not initiated. Optionally, if the first configuration request message further includes the time window information, the AMF may alternatively initiate S309 to S314 for the target UE only when determining, in a time window indicated by the time window information, that the target UE is located in the target area.

Optionally, when the AMF receives a handover request or a registration request message of the target UE before the time window indicated by the time window information ends, if the AMF determines that the target UE enters the target area, the AMF initiates the process shown in S309 to S314 for the target UE. It should be understood that the handover request or the registration request received by the AMF includes the current location information of the target UE, for example, list of RAN devices/TAI information.

It should be understood that the AMF stores the information about the RAN device in which the UE served by the AMF is currently located or the TAI information.

S309. The AMF sends a user policy association request message to a PCF.

The user policy association request message may include the ASP ID. Optionally, the user policy association request message may further include one or more of the following: the traffic descriptor information, the time window information, the first area information, the internal transaction identifier, the DNN, and the S-NSSAI.

It should be noted that, in a roaming scenario, in a manner, S309 is specifically as follows: The AMF sends the user policy association request message to a V-PCF. In another manner, S309 is specifically as follows: The AMF sends the user policy association request message to a V-PCF, and then the V-PCF forwards the user policy association request message to an H-PCF. It should be understood that, in the roaming scenario, a PCF in a subsequent step may be the V-PCF or the H-PCF correspondingly.

S310. The PCF sends a third response message to the AMF.

The third response message is used to indicate that the PCF successfully receives the user policy association request message. It should be understood that S310 is an optional step.

S311. The PCF generates a first URSP based on the user policy association request message.

S312 to S314 are the same as S240 to S260, and reference may be made to S240 to S260.

Based on the method provided in this application, the AF delivers the configuration request related to the first service to the AMF by using the NEF. The AMF initiates, based on the configuration request, a user policy association request to the PCF for the target UE that enters the target area, so that the PCF may update a URSP on the target UE in a timely manner, to provide network guarantee for the target UE to access an application deployed in the target area.

Figure 4:
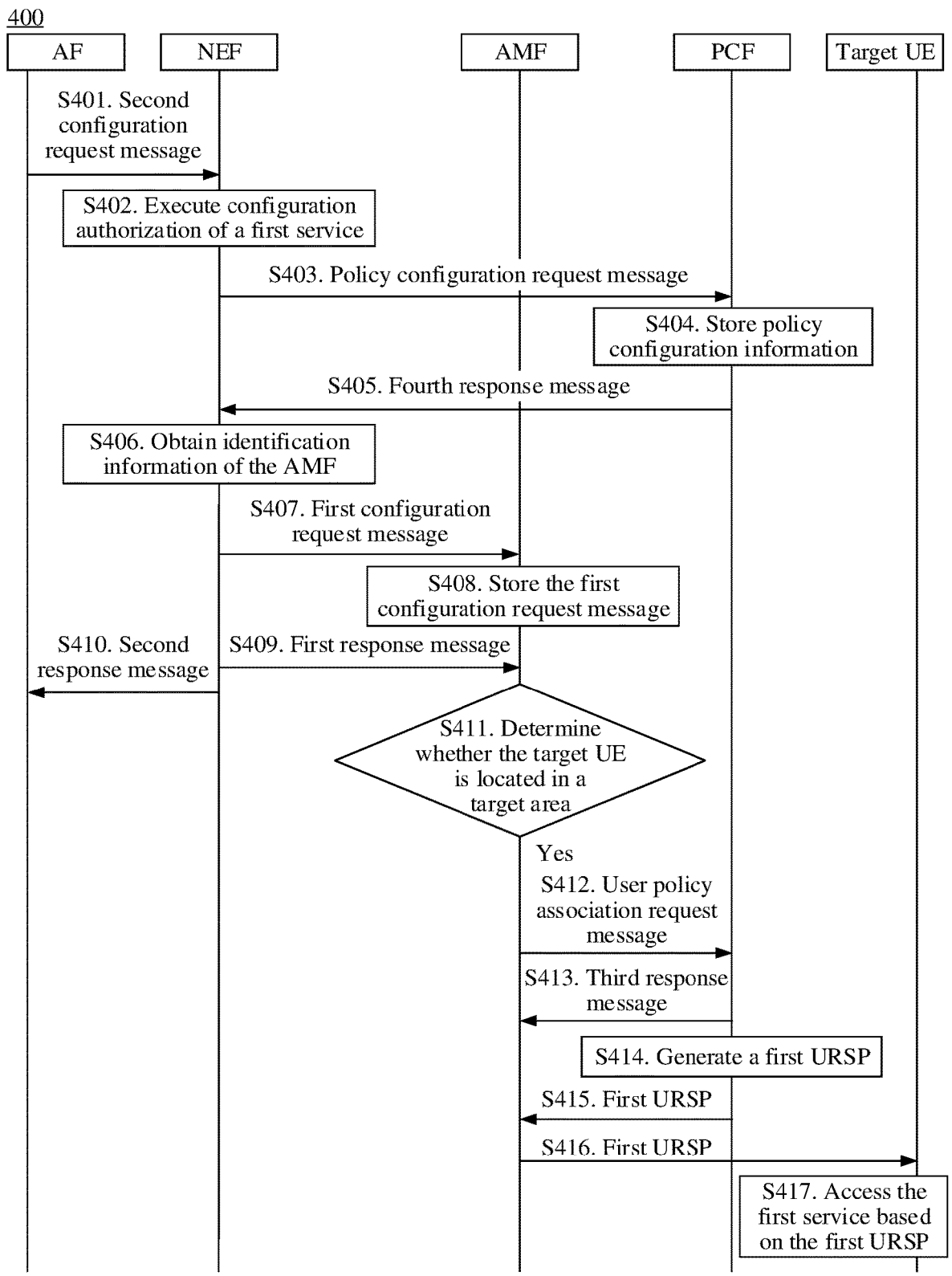
FIG. 4 is a schematic flowchart of another specific example of a service configuration method according to this application.

FIG. 4 is a schematic flowchart of a service configuration method. As shown in FIG. 4, the method 400 may include some or all of S401 to S417. The following separately describes the steps.

S401 and S402 are the same as S301 and S302, and reference may be made to S301 and S302.

S403. The NEF sends a policy configuration request message to a PCF.

The policy configuration request message may include an ASP ID. Optionally, the policy configuration request message may further include one or more of the following: traffic descriptor information, time window information, first area information, an internal transaction identifier, a DNN, and S-NSSAI.

For example, the policy configuration request message may be sent only to a PCF node in a current network (where in a roaming scenario, an I-NEF sends the policy configuration request message to a PCF node in a visited network, and in a non-roaming scenario, the NEF sends the policy configuration request message to a PCF node in a home network.)

S404. The PCF stores received policy configuration information.

It should be understood that the policy configuration information is content included in the policy configuration request message.

S405. The PCF sends a fourth response message to the NEF.

The fourth response message is used to indicate that the PCF successfully receives the policy configuration request message.

S406 is the same as S303, and reference may be made to S303.

S407. The NEF sends a first configuration request message to the AMF identified by identification information of the AMF.

Step S407 is similar to step S304. A difference lies in that, in S407, the first configuration request message may include first area information.

Optionally, the first configuration request message may further include one or more of the following: the ASP ID, the traffic descriptor information, the time window information, the internal transaction identifier, the DNN, and the S-NSSAI.

For example, the first configuration request message may include the ASP ID, the first configuration request message may include the internal transaction identifier, or may include both the ASP ID and the internal transaction identifier.

S408 to S410 are the same as S305 to S307, and reference may be made to S305 to S307.

S411. The AMF determines whether target UE is located in a target area.

Specifically, the AMF compares the first area information in the first configuration request message with current location information of the target UE served by the AMF. If one target UE is located in the target area, the AMF initiates a process shown in S412 to S417 for the target UE. Otherwise, the process is not initiated. Optionally, if the first configuration request message further includes the time window information, the AMF initiates S412 to S417 for the target UE only when determining, in a time window indicated by the time window information, that the target UE is located in the target area.

Optionally, when the AMF receives a handover request or a registration request message of the target UE before the time window indicated by the time window information ends, if the AMF determines that the target UE enters the target area, the AMF initiates the process shown in S412 to S417 for the target UE. It should be understood that the handover request or the registration request received by the AMF includes the current location information of the target UE, for example, information about a RAN device and/or TAI information.

It should be understood that the AMF stores the information about the RAN device in which the UE served by the AMF is currently located and/or the TAI information.

S412. The AMF sends a user policy association request message to the PCF.

The user policy association request message may include the internal transaction identifier and/or the ASP ID. The PCF may obtain the policy configuration information from locally stored information based on the internal transaction identifier and/or the ASP ID, so that the PCF may decide a URSP based on the policy configuration information and configuration information of a local operator, to generate a first URSP. It should be understood that if the PCF obtains the policy configuration information based on the internal transaction identifier, the policy configuration information further includes the internal transaction identifier.

Optionally, the user policy association request message may further include one or more of the following: the time window information, the first area information, the internal transaction identifier, the DNN, and the S-NSSAI.

It should be noted that, in the roaming scenario, in a manner, S412 is specifically as follows: The AMF sends the user policy association request message to a V-PCF. In another manner, S412 is specifically as follows: The AMF sends the user policy association request message to a V-PCF, and then the V-PCF forwards the user policy association request message to an H-PCF. It should be understood that, in the roaming scenario, a PCF in a subsequent step may be the V-PCF or the H-PCF correspondingly.

S413. The PCF sends a third response message to the AMF.

The third response message is used to indicate that the PCF successfully receives the user policy association request message. It should be understood that S413 is an optional step.

S414. The PCF generates the first URSP based on the user policy association request message and the stored policy configuration information.

S415 to S417 are the same as S240 to S260, and reference may be made to S240 to S260.

Based on the method provided in this application, the AF delivers information (that is, the policy configuration information) required for deciding the URSP to a specific PCF node (or all PCF nodes in a network, or a PCF node that supports deciding an access and mobility policy) in an operator network by using the NEF, and delivers a service-related configuration request to the AMF. The AMF initiates, based on the configuration request, a user policy association request to the PCF for the target UE that enters the target area, so that the PCF may update a URSP on the target UE in a timely manner, to provide network guarantee for the target UE to access an application deployed in the target area.

Figure 5A:
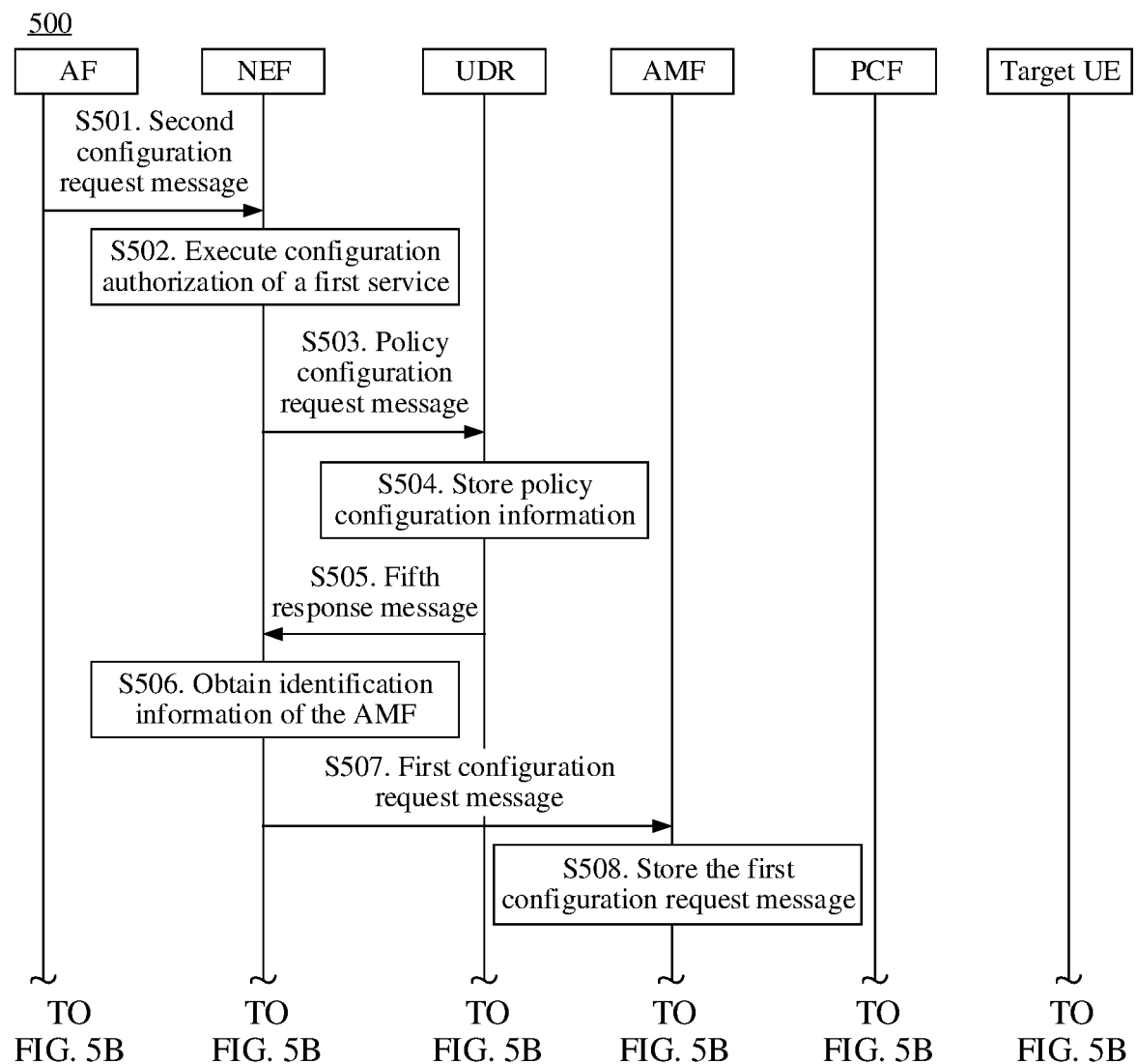
FIG. 5A and FIG. 5B are a schematic flowchart of still another specific example of a service configuration method according to this application.
Figure 5B:
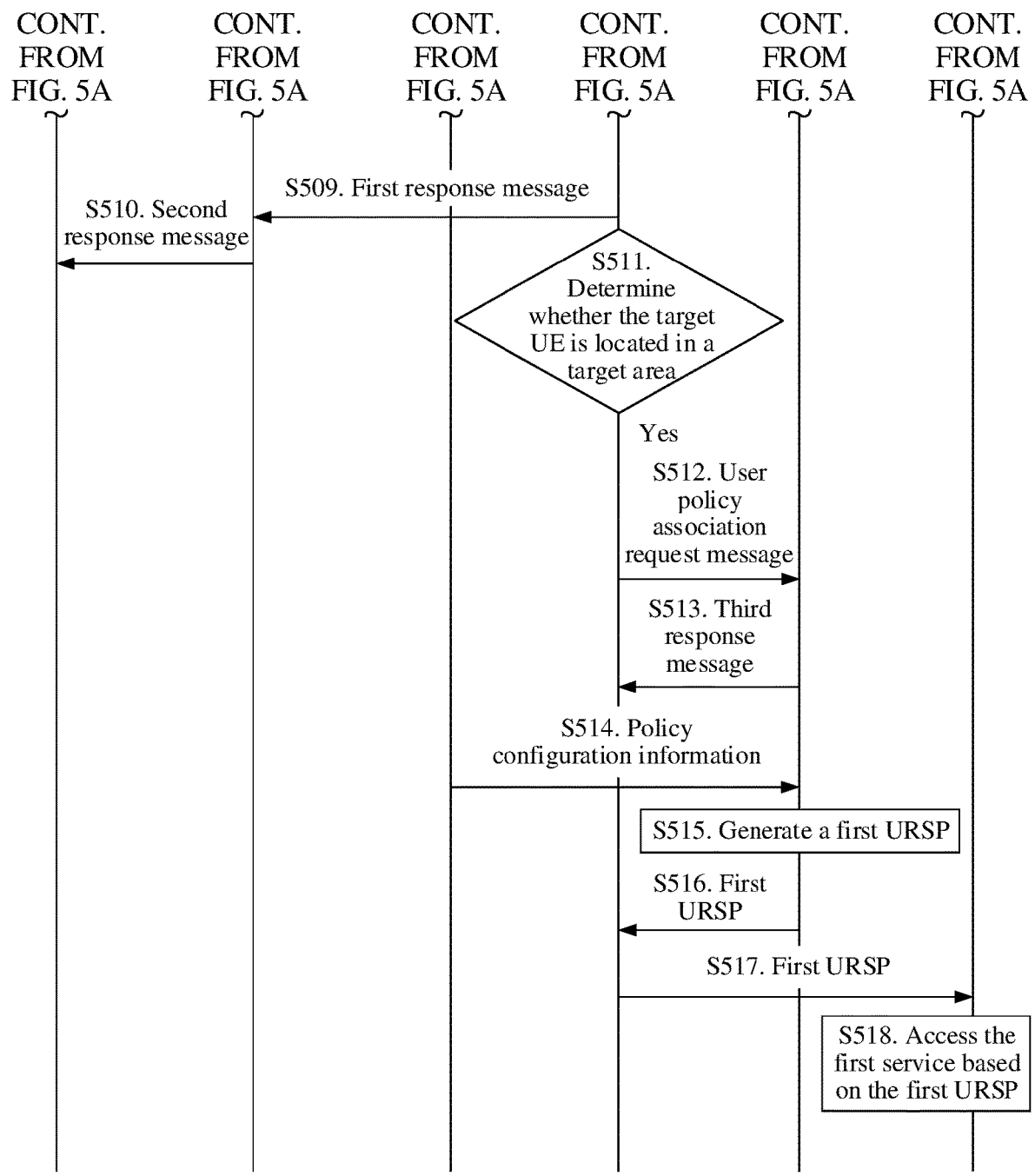

FIG. 5A and FIG. 5B are a schematic flowchart of a service configuration method. As shown in FIG. 5A and FIG. 5B, the method 500 may include some or all of S501 to S518. The following separately describes the steps.

S501 and S502 are the same as S301 and S302, and reference may be made to S301 and S302.

S503. The NEF sends a policy configuration request message to a UDR.

The policy configuration request message may include an ASP ID. Optionally, the policy configuration request message may further include one or more of the following: traffic descriptor information, time window information, first area information, an internal transaction identifier, a DNN, and S-NSSAI.

For example, the NEF may store content in the policy configuration request message, that is, policy configuration information, as application information (Application Data) in the UDR. Subsequently, a PCF may obtain the policy configuration information from the UDR based on the internal transaction identifier or the ASP ID. Alternatively, the UDR may push the policy configuration information to the PCF. Optionally, after obtaining the policy configuration information, the PCF may store the policy configuration information for subsequent use.

S504. The UDR stores the policy configuration information.

S505. The UDR sends a fifth response message to the NEF.

The fifth response message is used to indicate that the UDR successfully receives the policy configuration request message. It should be understood that S505 is an optional step.

S506 to 511 are the same as S406 to S411, and reference may be made to S406 to S411.

It should be understood that S510 may be performed at any time after S501 or S502.

S512. The AMF sends a user policy association request message to the PCF.

The user policy association request message may include the internal transaction identifier and/or the ASP ID.

Optionally, the user policy association request message may further include one or more of the following: the time window information, the first area information, the internal transaction identifier, the DNN, and the S-NSSAI.

It should be noted that, in a roaming scenario, in a manner, S512 is specifically as follows: The AMF sends the user policy association request message to a V-PCF. In another manner, S512 is specifically as follows: The AMF sends the user policy association request message to a V-PCF, and then the V-PCF forwards the user policy association request message to an H-PCF. It should be understood that, in the roaming scenario, a PCF in a subsequent step may be the V-PCF or the H-PCF correspondingly.

S513. The PCF sends a third response message to the AMF.

The third response message is used to indicate that the PCF successfully receives the user policy association request message. It should be understood that S513 is an optional step.

S514. The PCF obtains the policy configuration information from the UDR based on the user policy association request message.

The PCF may obtain the policy configuration information from the UDR based on the internal transaction identifier and/or the ASP ID, or the PCF may obtain, based on the internal transaction identifier and/or the ASP ID, the policy configuration information from the information pushed by the UDR to the PCF, and may further generate a first URSP based on the policy configuration information and configuration information of a local operator. It should be understood that if the PCF obtains the policy configuration information from the UDR based on the internal transaction identifier, the policy configuration information further includes the internal transaction identifier.

S515. The PCF generates the first URSP based on the policy configuration information.

S516 to S518 are the same as S240 to S260, and reference may be made to S240 to S260.

Based on the method provided in this application, the AF delivers the policy configuration information to the UDR by using the NEF, and delivers a service-related configuration request to the AMF. The AMF initiates, based on the configuration request, a user policy association request to the PCF for target UE that enters the target area, so that the PCF may update a URSP on the target UE in a timely manner based on the policy configuration information obtained from the UDR, to provide network guarantee for the target UE to access an application deployed in the target area.

Figure 6:
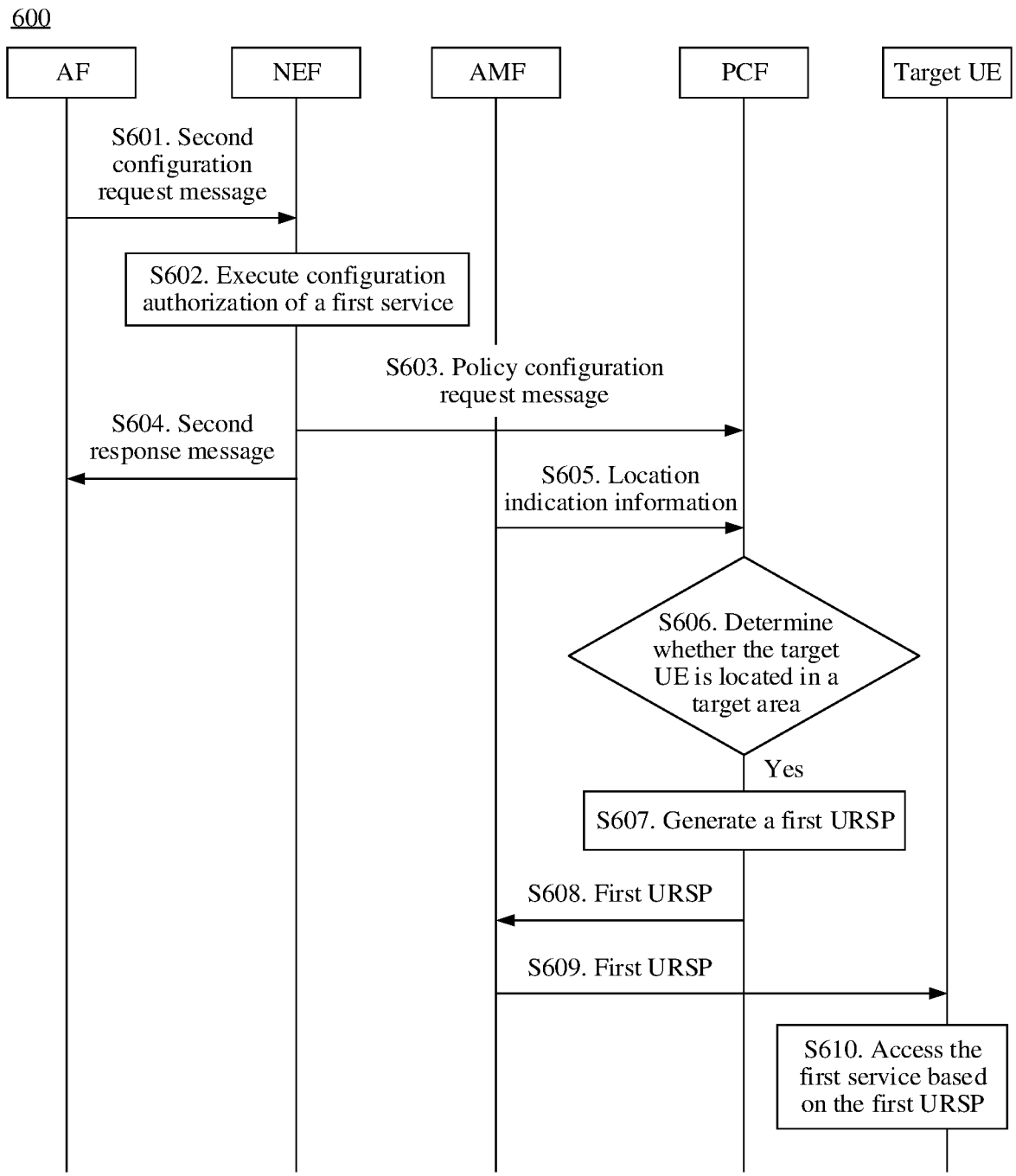
FIG. 6 is a schematic flowchart of another service configuration method according to this application.

FIG. 6 shows another service configuration method according to this application. In the foregoing method, the AMF determines whether target UE is located in the target area. In the method, a PCF determines whether the target UE is located in the target area. As shown in FIG. 6, the method 600 may include some or all of S601 to S610. The following separately describes the steps.

S601 and S602 are the same as S301 and S302, and reference may be made to S301 and S302.

S603. The NEF sends a policy configuration request message to all PCFs, some PCFs having a user policy decision function, or a PCF that supports providing a service for an area in a network.

After receiving the policy configuration request message, the PCF stores content in the policy configuration request message, that is, policy configuration information. The policy configuration information includes first area information and an ASP ID.

Optionally, the policy configuration request message may further include one or more of the following: traffic descriptor information, time window information, the first area information, an internal transaction identifier, a DNN, and S-NSSAI.

In an alternative manner of S603, the NEF may alternatively send the policy configuration request message to a UDR. Correspondingly, before the following step S607 is performed, the policy configuration information in the policy configuration request message needs to be first obtained from the UDR. In a manner, when receiving location indication information sent by an AMF, the PCF may obtain the policy configuration information from the UDR. In another manner, the UDR may actively push the policy configuration information to the PCF.

S604. The NEF sends a second response message to the AF. The second response message is used to indicate that the NEF successfully receives the second configuration request message.

It should be understood that S604 is an optional step.

S605. The AMF sends location indication information to the PCF.

The location indication information is used to indicate a current location of target UE, or the location indication information is used to indicate that target UE enters or leaves a target area.

Optionally, S605 may be specifically implemented in two manners.

Manner 1: When initiating a registration request and/or a handover request, the target UE sends a policy control request message to the PCF, where the policy control request message includes the location indication information. For example, the policy control request message is a policy control establishment request message or a policy control update request message.

Manner 2: The PCF may subscribe to a UE location change event from the AMF, for example, subscribe to an event that UE enters the target area. In this case, when the UE enters the target area, the AMF sends the location indication information to the PCF. Optionally, the PCF may only subscribe to a location change event of the target UE.

An example in which the PCF subscribes to the location change event of the target UE is used. A process in which the PCF subscribes to the location change event of the target UE from the AMF may include: The PCF sends an event subscription request message to the AMF, where the event subscription request message is used to subscribe to the location change event of the target UE in the target area. In this case, when the target UE enters the target area, the AMF sends the location indication information to the PCF.

S606. The PCF determines, based on the location indication information, whether the target UE is located in the target area.

If the UE is located in the target area, S607 is performed; otherwise, S607 and subsequent steps are not performed.

S607. The PCF generates a first URSP based on the policy configuration information.

For example, the PCF may determine traffic descriptor information and user selection descriptor information based on the policy configuration information and local configuration information, to generate the first URSP.

S608 to S610 are the same as S240 to S260, and reference may be made to S240 to S260.

Based on the method provided in this application, the AMF does not need to perceive a related configuration process of the first service, and the PCF directly determines, based on the location information provided by the AMF, whether the target UE is located in the target area. If the target UE is located in the target area, the PCF decides a user policy and provides an updated URSP policy rule for the target UE, to provide network guarantee for the target UE to access an application deployed in the target area.

The foregoing describes in detail the methods provided in the embodiments of this application with reference to FIG. 2 to FIG. 6. The following describes in detail apparatuses provided in embodiments of this application with reference to FIG. 7 to FIG. 9.

Figure 7:
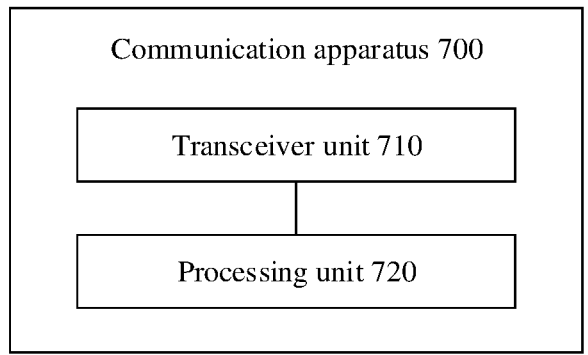
FIG. 7 is a schematic block diagram of a communication apparatus according to this application.

FIG. 7 is a schematic block diagram of a communication apparatus according to an embodiment of this application. As shown in FIG. 7, a communication apparatus 700 may include a transceiver unit 710 and a processing unit 720.

The transceiver unit 710 may be configured to receive information (or a message) sent by another apparatus, and may be further configured to send the information (or the message) to the another apparatus. For example, the transceiver unit 710 sends or receives a user policy association request message. The processing unit 720 may be configured to perform internal processing of the apparatus, for example, generate a first URSP.

In a possible design, the communication apparatus 700 may correspond to the AMF in the foregoing method embodiments. For example, the communication apparatus 1700 may be an AMF, or may be a chip in the AMF. The communication apparatus 700 may include units configured to perform operations performed by the AMF in the foregoing method embodiments, and the units in the communication apparatus 700 are separately configured to implement the operations performed by the AMF in the foregoing method embodiments.

For example, in an implementation, the transceiver unit 710 may be configured to: receive a first configuration request message from a network exposure network element (for example, an NEF), where the first configuration request message includes first area information, and the first area information is used to indicate a target area; if the processing unit 720 determines that a target terminal device is located in the target area, send the user policy association request message to a policy control network element, where the user policy association request message is used to request the policy control network element to configure a first user routing selection policy URSP for the target terminal device, and the first URSP is used by the target terminal device to access a first service; and receive the first URSP from the policy control network element, and send the first URSP to the target terminal device (for example, target UE).

In a possible design, the communication apparatus 700 may correspond to the PCF in the foregoing method embodiments. For example, the communication apparatus 700 may be a PCF, or may be a chip in the PCF. The communication apparatus 700 may include units configured to perform operations performed by the PCF in the foregoing method embodiments, and the units in the communication apparatus 700 are separately configured to implement the operations performed by the PCF in the foregoing method embodiments.

For example, in an implementation, the transceiver unit 710 is configured to receive the user policy association request message from an access management network element (for example, an AMF), where the user policy association request message includes an application identifier, and the application identifier is used to indicate an application that provides a first service; the processing unit 720 is configured to generate a first user routing selection policy URSP based on the user policy association request message, where the first URSP is used by a target terminal device to access the first service; and the transceiver unit 710 is further configured to send the first URSP to the target terminal device (for example, target UE).

In another implementation, the transceiver unit 710 is configured to obtain policy configuration information, where the policy configuration information includes an application identifier, and the application identifier is used to indicate an application that provides a first service; the transceiver unit 710 is further configured to receive the user policy association request message from an access management network element (for example, an AMF), where the user policy association request message is used to request the apparatus to configure a first user routing selection policy URSP for a target terminal device (for example, target UE), the first URSP is used by the target terminal device to access the first service, and the target terminal device is located in a target area; the processing unit 720 is configured to generate the first URSP based on the policy configuration information; and the transceiver unit 710 is further configured to send the first URSP to the target terminal device.

In still another implementation, the transceiver unit 710 is configured to obtain policy configuration information, where the policy configuration information includes first area information and an application identifier, the first area information is used to indicate a target area, and the application identifier is used to indicate an application that provides a first service; the transceiver unit 710 is further configured to receive location indication information from an access management network element; the processing unit 720 is configured to: if determining that a target terminal device is located in the target area based on the location indication information, generate a first user routing selection policy URSP based on the policy configuration information; and the transceiver unit 710 is further configured to send the first URSP to the target terminal device, where the first URSP is used by the target terminal device to access the first service.

In a possible design, the communication apparatus 700 may correspond to the NEF in the foregoing method embodiments. For example, the communication apparatus 700 may be an NEF, or may be a chip in the NEF. The communication apparatus 700 may include units configured to perform operations performed by the NEF in the foregoing method embodiments, and the units in the communication apparatus 700 are separately configured to implement the operations performed by the NEF in the foregoing method embodiments.

In a possible design, the communication apparatus 700 may correspond to the AF in the foregoing method embodiments. For example, the communication apparatus 700 may be an AF, or may be a chip in the AF. The communication apparatus 700 may include units configured to perform operations performed by the AF in the foregoing method embodiments, and the units in the communication apparatus 700 are separately configured to implement the operations performed by the AF in the foregoing method embodiments.

In a possible design, the communication apparatus 700 may correspond to the UDR in the foregoing method embodiments. For example, the communication apparatus 700 may be a UDR, or may be a chip in the UDR. The communication apparatus 700 may include units configured to perform operations performed by the UDR in the foregoing method embodiments, and the units in the communication apparatus 700 are separately configured to implement the operations performed by the UDR in the foregoing method embodiments.

In a possible design, the communication apparatus 700 may correspond to the target UE in the foregoing method embodiments. For example, the communication apparatus 700 may be target UE, or may be a chip in the target UE. The communication apparatus 700 may include units configured to perform operations performed by the target UE in the foregoing method embodiments, and the units in the communication apparatus 700 are separately configured to implement the operations performed by the target UE in the foregoing method embodiments.

Figure 8:
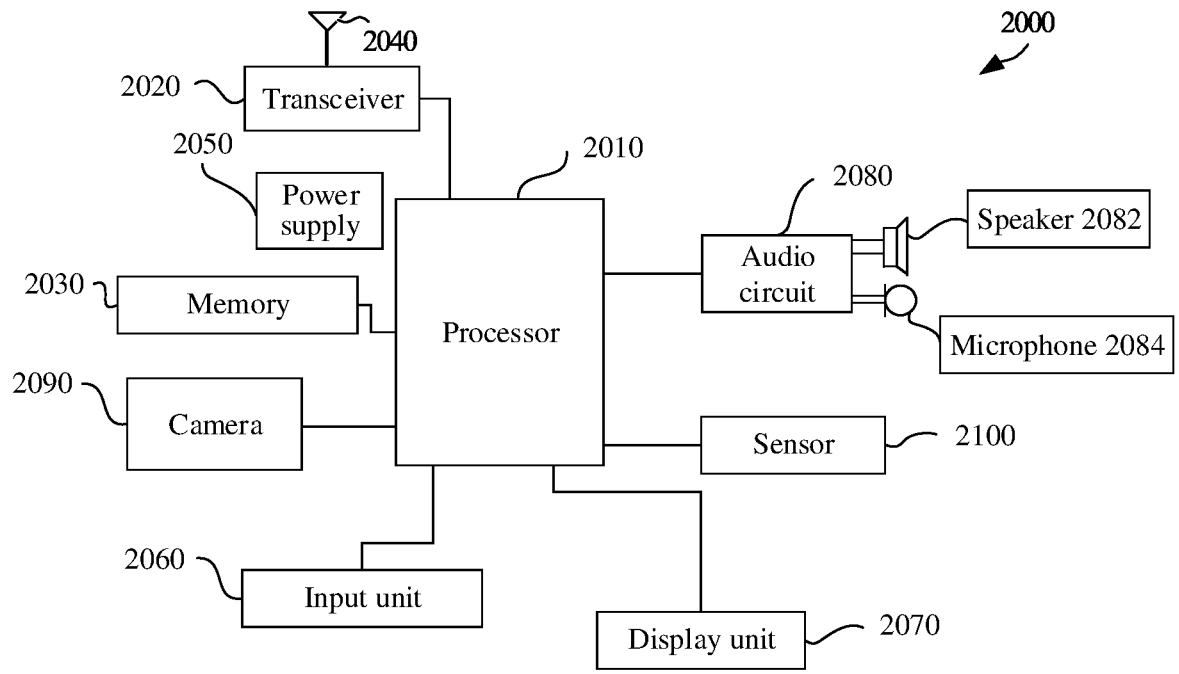
FIG. 8 is a schematic block diagram of a terminal device according to this application.

It should be understood that when the communication apparatus 700 is the target UE, the transceiver unit 710 in the communication apparatus 700 may correspond to a transceiver 2020 in a terminal device 2000 shown in FIG. 8, and the processing unit 720 in the communication apparatus 700 may correspond to a processor 2010 in the terminal device 2000 shown in FIG. 8.

It should be further understood that, when the communication apparatus 700 is a chip disposed in the UE, the transceiver unit 710 in the communication apparatus 700 may be an input/output interface.

Figure 9:
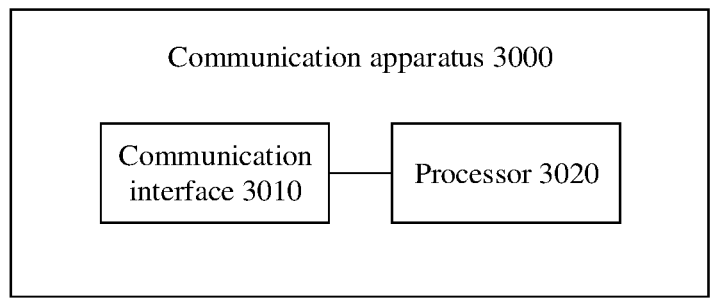
FIG. 9 is a schematic block diagram of another communication apparatus according to this application.

It should be understood that when the communication apparatus 700 corresponds to any network element of an AMF, a PCF, an AF, an NEF and a UDR, the transceiver unit 710 in the communication apparatus 700 may correspond to a communication interface 3010 shown in FIG. 9, and the processing unit 720 may correspond to a processor 3020 shown in FIG. 9.

FIG. 8 is a schematic diagram of a structure of a terminal device 2000 according to an embodiment of this application. The terminal device 2000 may be used in the system shown in FIG. 1, to perform a function of the target UE in the foregoing method embodiments. As shown in FIG. 8, the terminal device 2000 includes a processor 2010 and a transceiver 2020. Optionally, the terminal device 2000 further includes a memory 2030. The processor 2010, the transceiver 2002, and the memory 2030 may communicate with each other through an internal connection path, to transfer a control signal or a data signal. The memory 2030 is configured to store a computer program. The processor 2010 is configured to invoke and run the computer program in the memory 2030, to control the transceiver 2020 to receive and send a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 7.

The transceiver 2020 may correspond to the transceiver unit in FIG. 7. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 8 can implement processes related to the target UE in any method embodiment in the foregoing method embodiments. Operations or functions of modules in the terminal device 2000 are intended to implement corresponding processes in the foregoing method embodiments. For details, refer to the descriptions in the foregoing method embodiments. To avoid repetition, detailed descriptions are properly omitted herein.

The processor 2010 may be configured to perform an action that is internally implemented by the target UE and that is described in the foregoing method embodiments, and the transceiver 2020 may be configured to perform an action that is sent by the target UE to another element or received from the another network element in the foregoing method embodiments. For details, refer to the descriptions in the foregoing method embodiments. Details are not described herein again.

Optionally, the terminal device 2000 may further include a power supply 2050, configured to supply power to components or circuits in the terminal device.

In addition, to improve functions of the terminal device, the terminal device 2000 may further include one or more of an input unit 2060, a display unit 2070, an audio circuit 2080, a camera 2090, a sensor 2100, and the like. The audio circuit may further include a speaker 2082, a microphone 2084, and the like.

FIG. 9 is a schematic diagram of a structure of a communication apparatus according to an embodiment of this application. It should be understood that the communication apparatus 3000 shown in FIG. 9 is merely an example. The communication apparatus in this embodiment of this application may further include other modules or units, may include modules having functions similar to those of modules in FIG. 9, or may not necessarily include all modules in FIG. 9.

The communication apparatus 3000 includes a communication interface 3010 and at least one processor 3020.

The communication apparatus 3000 may correspond to any network element of an AMF, a PCF, an AF, an NEF, and a UDR. For example, the at least one processor 3020 may be configured to perform an action that is internally implemented by a corresponding network element in the foregoing method embodiments, and the transceiver 2020 may be configured to perform an action that is sent by the corresponding network element to another network element or received from the another network element in the foregoing method embodiments. For details, refer to the descriptions in the foregoing method embodiments. Details are not described herein again. For example, the at least one processor 3020 executes program instructions, to enable the communication apparatus 3000 to implement a corresponding process of the method executed by a corresponding network element in the foregoing method embodiments.

Optionally, the communication apparatus 3000 may further include a memory. The memory may store program instructions, and the at least one processor 3020 may read the program instructions stored in the memory and execute the program instructions.

It should be understood that, the processor in this embodiment of this application may be a central processing unit (CPU), the processor may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

According to the methods provided in embodiments of this application, this application further provides a computer program product. The computer program product includes computer program code. When the computer program code is run on a computer, the computer is enabled to perform the method corresponding to any network element in the foregoing method embodiments.

According to the method provided in embodiments of this application, this application further provides a system, including at least one of the foregoing target UE, the AMF, the PCF, the AF, the NEF, and the UDR.

An embodiment of this application further provides a processing apparatus, including a processor and an interface. The processor is configured to perform the method in any one of the foregoing method embodiments.

It should be understood that the processing apparatus may be a chip. For example, the processing apparatus may be a field programmable gate array (FPGA), may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processing circuit (DSP), a micro controller unit (MCU), a programmable controller (PLD) or another integrated chip. The processing apparatus may implement or perform methods, steps, and logical block diagrams that are disclosed in embodiments of this application. The general-purpose processor may be a microprocessor, or the processor may be any conventional processor or the like. Steps of the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

It may be understood that the memory in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memories in the systems and method described in this specification include but are not limited to these memories and any memory of another proper type.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the processes or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

The network device and the terminal device in the foregoing apparatus embodiments completely correspond to the network device or terminal device in the method embodiments. A corresponding module or unit performs a corresponding step. For example, a communication unit (a transceiver) performs a receiving or a sending step in the method embodiments, and a processing unit (a processor) performs another step other than the sending or the receiving step. For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that is run on a processor, the processor, an object, an executable file, a thread of execution, a program, or a computer. As illustrated by using figures, both an application that runs on a computing device and the computing device may be components. One or more components may reside within a process or a thread of execution, and a component may be located on one computer or distributed between two or more computers. In addition, these components may be executed from various computer-readable media that store various data structures. For example, the components may communicate by using a local or remote process, for example, based on a signal having one or more data packets (for example, data from two components interacting with another component in a local system, a distributed system, or across a network such as the internet interacting with another system by using the signal).

It should be understood that "an embodiment" mentioned in the entire specification means that particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any proper manner.

It should be understood that, in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that, in this application, "when" and "if" mean that a network element performs corresponding processing in an objective situation, and are not intended to limit time, and the network element is not necessarily required to have a determining action during implementation, and do not mean any other limitation.

It should be further understood that in embodiments of this application, "B corresponding to A" indicates that B is associated with A, and B may be determined based on A. However, it should be further understood that determining B based on A does not mean that B is determined based on only A. B may alternatively be determined based on A and/or other information.

It should also be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be performed.

A person of ordinary skill in the art may be aware that, units and algorithm steps in examples described with reference to the embodiments disclosed in this specification can be implemented by electronic hardware or a combination of computer software and electronic hardware. Whether functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for a purpose of convenient and brief descriptions, for a detailed working process of the foregoing system, apparatus, and unit, refer to a corresponding process in the foregoing method embodiment. Details are not described herein.

In the several embodiments provided in this application, it should be understood that the disclosed system, the apparatus, and the method may be implemented in other manners. For example, the described apparatus embodiments are merely examples. For example, division into the units is merely logical function division. In an actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and the indirect couplings or communication connections between apparatuses or units may be implemented in an electronic form, a mechanical form, or another form.

Units described as separate components may or may not be physically separated, and components displayed as units may or may not be physical units. That is, the units may be located at one location, or may be distributed to a plurality of network units. Some or all of the units may be selected depending on an actual requirement to implement the objectives of the solutions of the embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods in embodiments of this application. The foregoing storage medium includes any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:
    a policy control network element;
    a network exposure network element; and
    an access management network element, configured to:
        in response to determining that a target terminal device is located in a target area, send a user policy association request message to the policy control network element, wherein the user policy association request message requests the policy control network element to configure a first user routing selection policy (URSP) for the target terminal device, and the first URSP is used by the target terminal device to access a first service;
    wherein the policy control network element is configured to:
        generate the first URSP based on the user policy association request message, and send the first URSP to the access management network element; and
    wherein the access management network element is further configured to send the first URSP to the target terminal device; and
    wherein the network exposure network element is configured to send a first configuration request message to the access management network element, wherein the first configuration request message comprises first area information, and the first area information indicates the target area.

2. The system according to claim 1, wherein:
    the network exposure network element is further configured to send a policy configuration request message to the policy control network element, wherein the policy configuration request message requests policy configuration of the first service, and the policy configuration request message comprises policy configuration information of the first service; and
    the policy control network element being configured to generate the first URSP based on the user policy association request message comprises:
        the policy control network element being configured to generate the first URSP based on the user policy association request message and the policy configuration information.

3. The system according to claim 1, wherein the first configuration request message and the user policy association request message each further comprise an application identifier, and the application identifier indicates an application that provides the first service.

4. The system according to claim 3, wherein the first configuration request message further comprises one or more of the following: an internal group identifier, traffic descriptor information, time window information, an internal transaction identifier, a data network name (DNN), or single-network slice selection assistance information (S-NSSAI); and
    wherein, the user policy association request message further comprises one or more of the following: the traffic descriptor information, the time window information, the first area information, the DNN, or the S-NSSAI; and
    wherein:
        the internal group identifier indicates all target terminal devices that are allowed to access the first service;

the traffic descriptor information describes the first service;

the time window information indicates an availability time of the first service;

the internal transaction identifier identifies a configuration request for the first service; and the DNN and the S-NSSAI are determined by the network exposure network element based on the application identifier.

5. The system according to claim 4, wherein the first configuration request message further comprises at least two of the following: the internal group identifier, the traffic descriptor information, the time window information, the internal transaction identifier, the DNN, or the S-NSSAI.

6. The system according to claim 1, wherein:

the first configuration request message and the user policy association request message each comprise an application identifier and an internal transaction identifier, wherein the application identifier indicates an application that provides the first service, and the internal transaction identifier identifies a configuration request for the first service.

7. The system according to claim 1, wherein the first configuration request message and the user policy association request message each comprise an internal transaction identifier, and the internal transaction identifier identifies a configuration request for the first service.

8. An apparatus, comprising:

at least one processor; and a non-transitory computer readable storage medium storing a program that is executable by the at least one processor, the program including instructions to:

receive a first configuration request message from a network exposure network element, wherein the first configuration request message comprises first area information, and the first area information indicates a target area;

in response to determining that a target terminal device is located in the target area, send a user policy association request message to a policy control network element, wherein the user policy association request message requests the policy control network element to configure a first user routing selection policy (URSP) for the target terminal device, and the first URSP is used by the target terminal device to access a first service; and receive the first URSP from the policy control network element, and send the first URSP to the target terminal device.

9. The apparatus according to claim 8, wherein the first configuration request message and the user policy association request message each further comprise an application identifier, and the application identifier indicates an application that provides the first service.

10. The apparatus according to claim 9, wherein the first configuration request message further comprises one or more of the following: an internal group identifier, traffic descriptor information, time window information, an internal transaction identifier, a data network name (DNN), or single-network slice selection assistance information (S-NSSAI);

wherein the user policy association request message further comprises one or more of the following: the traffic descriptor information, the time window information, the first area information, the DNN, or the S-NSSAI; and wherein:

the internal group identifier indicates all target terminal devices that are allowed to access the first service;

the traffic descriptor information describes the first service;

the time window information indicates an availability time of the first service;

the internal transaction identifier identifies a configuration request for the first service; and the DNN and the S-NSSAI are determined by the network exposure network element based on the application identifier.

11. The apparatus according to claim 8, wherein the first configuration request message and the user policy association request message each comprise an application identifier and an internal transaction identifier, wherein the application identifier indicates an application that provides the first service, and the internal transaction identifier identifies a configuration request for the first service.

12. The apparatus according to claim 8, wherein the first configuration request message and the user policy association request message each comprise an internal transaction identifier, and the internal transaction identifier identifies a configuration request for the first service.

13. An apparatus, comprising:

at least one processor; and a non-transitory computer readable storage medium storing a program that is executable by the at least one processor, the program including instructions for:

obtaining policy configuration information, wherein the policy configuration information comprises an application identifier, and the application identifier indicates an application that provides a first service;

receiving a user policy association request message from an access management network element, wherein the user policy association request message requests the apparatus to configure a first user routing selection policy (URSP) for a target terminal device, the first URSP is used by the target terminal device to access the first service, and the target terminal device is located in a target area;

generating the first URSP based on the policy configuration information; and sending the first URSP to the target terminal device.

14. The apparatus according to claim 13, wherein the program further includes instructions for:

receiving a policy configuration request message from a network exposure network element, wherein the policy configuration request message comprises the policy configuration information.

15. The apparatus according to claim 13, wherein the program further includes instructions for:

obtaining the policy configuration information from a data storage network element.

16. The apparatus according to claim 13, wherein the policy configuration information further comprises one or more of the following: an internal group identifier, traffic descriptor information, time window information, an internal transaction identifier, first area information, a data network name (DNN), or single-network slice selection assistance information (S-NSSAI); and wherein:

the internal group identifier indicates all target terminal devices that are allowed to access the first service;

the traffic descriptor information describes the first service;

the time window information indicates availability time of the first service; or the internal transaction identifier identifies a configuration request for the first service; and wherein the first area information indicates the target area, and the target area is an area in which the target terminal device is allowed to access the first service; and wherein the DNN and the S-NSSAI are determined based on the application identifier.

17. The apparatus according to claim 13, wherein the user policy association request message comprises the application identifier and an internal transaction identifier, and the internal transaction identifier identifies a configuration request for the first service.

18. The apparatus according to claim 13, wherein the user policy association request message further comprises an internal transaction identifier, and the internal transaction identifier identifies a configuration request for the first service.

19. The apparatus according to claim 13, wherein the policy configuration information further comprises an internal group identifier, and wherein the internal group identifier indicates all target terminal devices that are allowed to access the first service.

20. The apparatus according to claim 13, wherein the policy configuration information further comprises traffic descriptor information, and wherein the traffic descriptor information describes the first service.

* * * * *